United States Patent [19]

Stewart et al.

[11] Patent Number: 5,433,816
[45] Date of Patent: Jul. 18, 1995

[54] ULTRASONIC APPARATUS FOR FORMING INDIVIDUAL PILLOWED CHIPS OF LIGHT LOCK MATERIAL

[75] Inventors: Wallace S. Stewart, Penfield; Gary E. Merz, Rochester; Dale C. Marshall, Hamlin, all of N.Y.

[73] Assignee: Eastman Kodak Company, Rochester, N.Y.

[21] Appl. No.: 4,819

[22] Filed: Jan. 15, 1993

[51] Int. Cl.⁶ .............................................. B32B 31/18
[52] U.S. Cl. ................................. 156/510; 156/220; 156/580.2; 156/73.1; 354/227
[58] Field of Search .................. 156/73.1, 250, 252, 156/253, 269, 270, 290, 219, 220, 510, 580.1, 580.2; 354/277

[56] References Cited

U.S. PATENT DOCUMENTS

| | | | |
|---|---|---|---|
| 2,064,731 | 12/1936 | Caserta | 164/86 |
| 2,655,212 | 10/1953 | Stewart | 164/22 |
| 3,242,785 | 3/1966 | Schieven et al. | 83/301 |
| 3,537,376 | 11/1970 | Fleming et al. | 95/67 |
| 3,670,614 | 6/1972 | Streckert | 83/208 |
| 3,722,336 | 3/1973 | Sarring | 83/63 |
| 3,736,209 | 5/1973 | Carpenter | 156/435 |
| 3,767,495 | 10/1973 | Miller | 156/72 |
| 3,993,532 | 11/1976 | McDonald et al. | 156/580 |
| 4,012,977 | 3/1977 | Regenbrecht | 83/368 |
| 4,035,215 | 7/1977 | Goldstone | 156/245 |
| 4,094,944 | 6/1978 | Paetz | 264/137 |
| 4,121,960 | 10/1978 | Focht | 156/219 |
| 4,237,181 | 12/1980 | Tanabe et al. | 428/307 |
| 4,344,342 | 8/1982 | Garvin | 83/45 |
| 4,362,773 | 12/1982 | Shikinami | 428/90 |
| 4,411,721 | 10/1983 | Wishart | 156/73.1 |
| 4,437,918 | 3/1984 | Morohashi et al. | 156/322 |
| 4,548,110 | 10/1985 | Reil | 83/176 |
| 4,561,917 | 12/1985 | Urai | 156/73.1 |
| 4,634,071 | 1/1987 | Hertel | 354/277 X |
| 4,659,614 | 4/1987 | Vitale | 428/218 |
| 4,686,136 | 8/1987 | Homonoff et al. | 428/286 |
| 4,770,730 | 9/1988 | Abe | 156/73.1 |
| 4,798,639 | 1/1989 | Yamaguchi | 156/73.1 |
| 4,863,550 | 9/1989 | Matsuo et al. | 156/353 |
| 4,867,826 | 9/1989 | Wayte | 156/219 |
| 4,878,985 | 11/1989 | Thomsen et al. | 156/459 |
| 4,913,368 | 4/1990 | Atkinson | 354/277 X |
| 4,968,369 | 11/1990 | Darcy et al. | 156/217 |

FOREIGN PATENT DOCUMENTS 59-192388A 10/1984 Japan .
2161419 1/1986 United Kingdom ......... B29C 27/08

Primary Examiner—Chester T. Barry
Assistant Examiner—J. Sells
Attorney, Agent, or Firm—Heslin and Rothenberg

[57] ABSTRACT

An ultrasonic apparatus and method for forming individual pillowed chips of light lock material are provided. An ultrasonic horn and ultrasonic anvil are used to form pillows in a composite web of light lock material. The pillowed web material is then notched and cut to produce individual chips of light lock material. Each individual chip has one pillowed edge and one non-pillowed, notched edge. The pillowing and notching facilitate placement of the individual chips of light lock material into a film cartridge.

11 Claims, 7 Drawing Sheets

ULTRASONIC APPARATUS FOR FORMING INDIVIDUAL PILLOWED CHIPS OF LIGHT LOCK MATERIAL

TECHNICAL FIELD

This invention relates to an ultrasonic apparatus for forming individual pillowed chips of light lock material. More particularly, the invention provides an ultrasonic horn and ultrasonic anvil for forming transverse seams in a web of light lock material. The web is then notched between the transverse seams, and cut at the transverse seams as well as between the transverse seams at the notches. The resulting individual chips of light lock material have one pillowed edge and one non-pillowed, notched edge for placement in a cartridge. The ultrasonic apparatus also allows controlled orientation of each of the individual chips for placement in a cartridge.

BACKGROUND ART

Most film cartridges (also called film magazines) incorporate some kind of fabric or woven material in their assembly as a means of preventing light from entering the film exit in the cartridge. This guards against premature exposure of the outer convolutions of the film. A common fabric incorporated as a light lock material is referred to as "velvet". Velvet is a nylon yarn fiber which is bundled and woven into a rayon fabric backing material.

Assembly of velvet light lock material to conventional metal film cartridges is accomplished by applying heat to both lips of the cartridges which have been formed by a die set (but are still in a multiple strip stage yet to be died out). The velvet is pre-slit to size and applied in continuous web form to both sides of the multi cartridge strip in the proper locations. The velvet web is then clamped under pressure while the heat from the metal cartridge strip activates an adhesive coated on the back of the rayon fabric of the velvet, attaching the rayon backing of the light lock web to the cartridge strip. Once the adhesive has cured, the cartridge strip is indexed to the next step in the process. There the two velvet webs are cut between the individual notches denoting each cartridge by a hot knife process. This process is satisfactory as long as the outer shell of the cartridge is made of sheet steel.

However, a new polystyrene cartridge is being developed as a consumer product in the 35 millimeter film range. One of the main requirements of this new product is that the cartridge shell be made of plastic instead of sheet steel. This requires a whole multitude of design changes to achieve automated assembly of light lock material to film cartridges.

SUMMARY OF THE INVENTION

The film cartridge is now plastic (polystyrene) and therefore cannot be heated to activate an adhesive. An alternative attachment method is required. It is also highly desirable that this attachment method allow for separation of the light lock material from the cartridge to facilitate recycling. Furthermore, the nature of the cartridge design requires the light lock material to be handled as individual pieces, rather than in continuous web form.

These needs are met by the subject invention which provides an ultrasonic apparatus for forming individual chips of light lock material suitable for placement in a film cartridge. The apparatus includes a pillowing means for forming transverse seams in the light lock material, notching means for cutting notches between the transverse seams, cutting means for cutting at the transverse seams and at the notches, and positioning means for moving the light lock material from the pillowing means to the notching means and cutting means.

The pillowing means preferably comprises an ultrasonic horn assembly, with an ultrasonic horn and ultrasonic anvil. A composite web of light lock material is moved through the apparatus, and the web positioned between the ultrasonic horn and ultrasonic anvil is pillowed or profiled by sealing a transverse seam across the web. The web is then repositioned and another seam is sealed.

The web with numerous transverse seams is also moved along to the notching means, which preferably comprises a punch and die assembly. The notching means cuts out corner notches of two adjacent chips of light lock material centrally between the transverse seams. These notches provide clearance for features to prevent leakage of light at the corners of a film cartridge.

The web is then moved along to the cutting means, which again preferably comprises a punch and die assembly. The cutting means cuts the web at the transverse seams to form a pillowed edge, and centrally between the transverse seams to form the non-pillowed, notched edge of the individual chip of light lock material.

Each individual chip of light lock material is then collected in a chip nest in the proper orientation for later insertion into a film cartridge. This is accomplished by utilizing fingers to support the individual chip as it leaves the cutting means and to place the individual chip into a chip nest on a conveyor belt.

A method and apparatus for producing individual pillowed chips of light lock material, maintaining their proper orientation, is thus provided. These pillowed chips can be utilized in plastic film cartridges as light lock material.

BRIEF DESCRIPTION OF THE DRAWINGS

These and other objects, advantages and features of the present invention will be more fully understood from the following detailed description of certain embodiments thereof when considered in conjunction with the accompanying drawings in which.

DESCRIPTION OF THE PREFERRED EMBODIMENTS

As indicated above, the subject invention is broadly directed to an ultrasonic apparatus for forming individual pillowed chips of light lock material, which can then be placed in a film cartridge. The invention involves the forming of a valley across the width of a fabric web which creates a curvature (pillow affect) to the adjacent areas perpendicular to the compressed flat cross section in the valley of the fabric web. After notching and cutting, the individual chips of light lock material can be placed in a film cartridge.

In accordance with the subject invention, a light lock chip manufacturing and application process is provided that:

1. Accepts foam light lock material in web form;
2. Ultrasonically profiles the web to provide the lead in required for film thrusting;
3. Notches the light lock web to provide the reliefs required to fit the light lock chips around cartridge features;
4. Cuts the profiled and notched light lock web into individual chips; and
5. Maintains the orientation of these light lock chips and delivers them to an application station.

Figure 1:
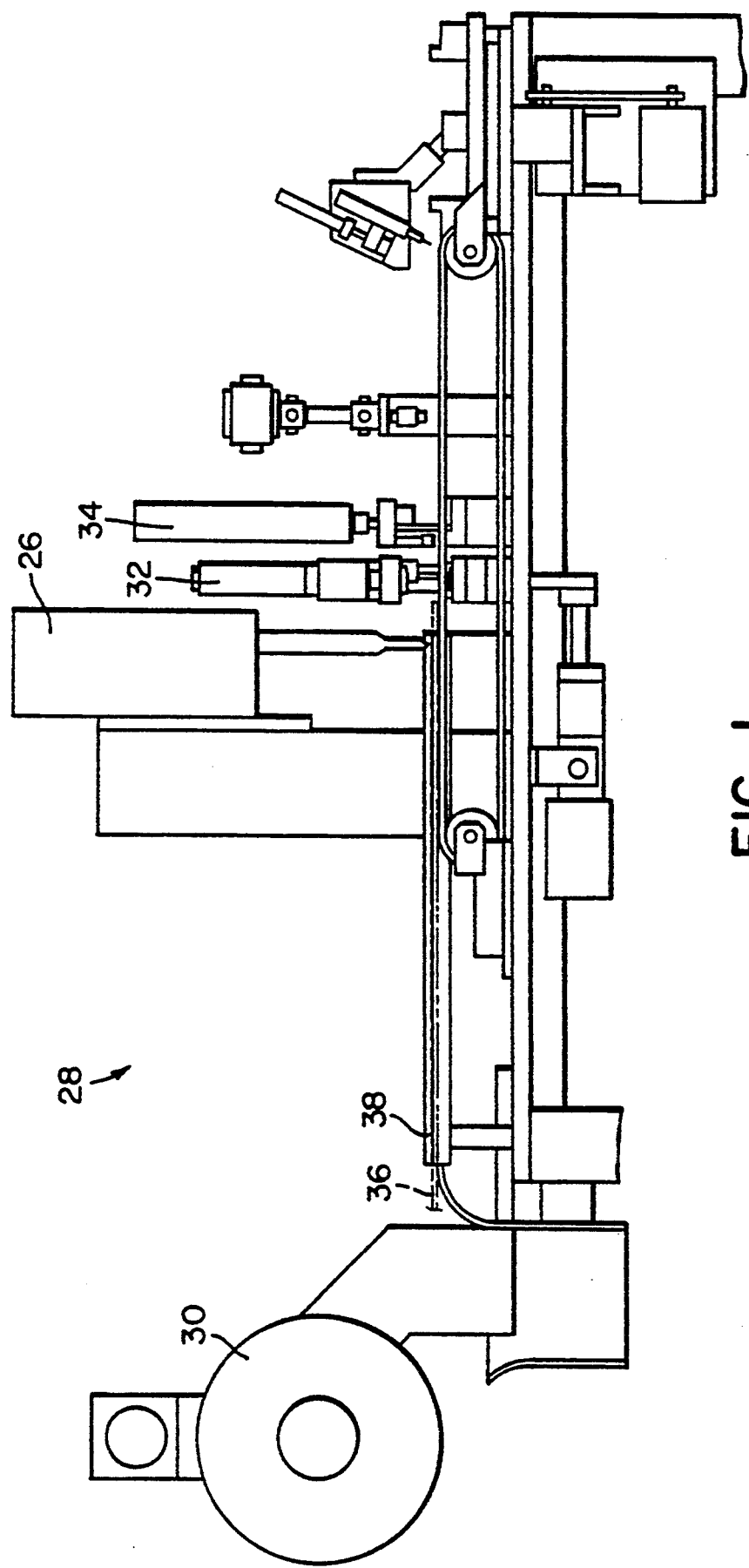
FIG. 1 is a cut-away side view of an ultrasonic apparatus for forming individual pillowed chips of light lock material according to one embodiment of the subject invention, and for placing the individual chips into a cartridge.

FIG. 1 shows an entire machine 28 with the product flow proceeding from left to right.

Figure 2:
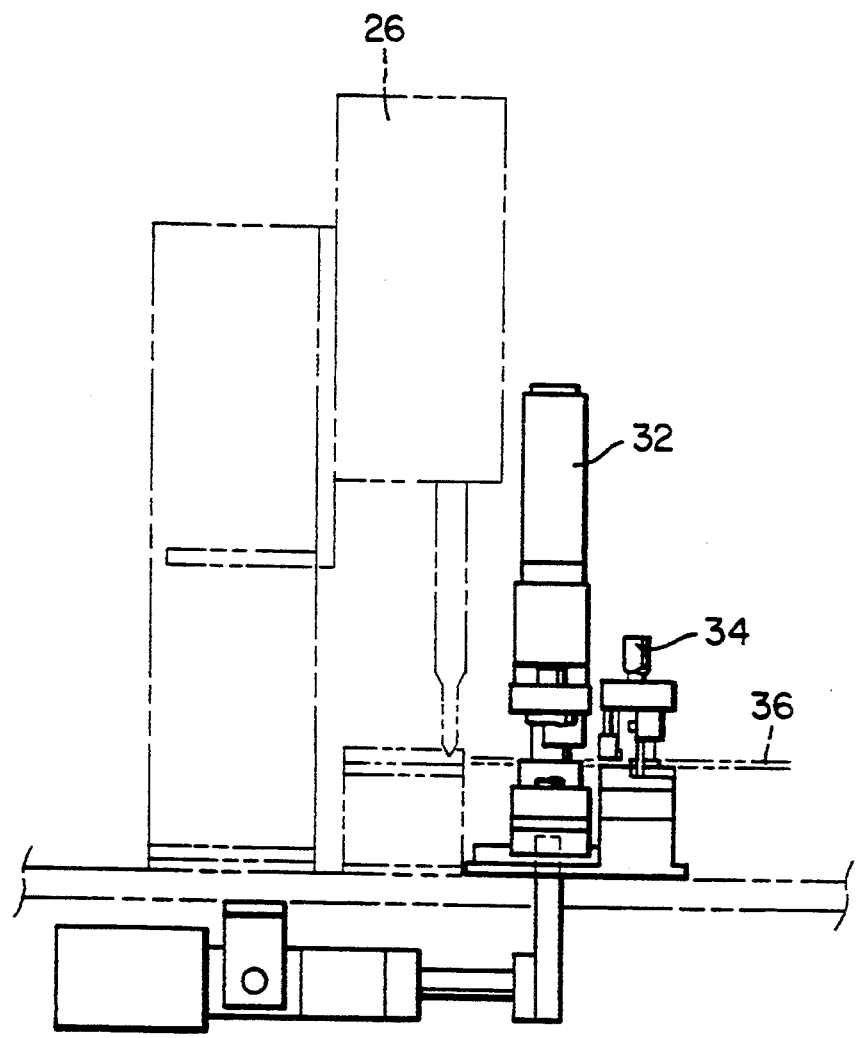
FIG. 2 is a cut-away side view of the pillowing, notching, and cutting means shown in FIG. 1.

The subject invention is directed to the front portion of this apparatus (see closeup in FIG. 2), meaning from the unwind 30 to the completion of the foam light lock chip at the notch shuttle 32 and cut-off assembly 34. The invention operates as follows.

Figures 5, 6:
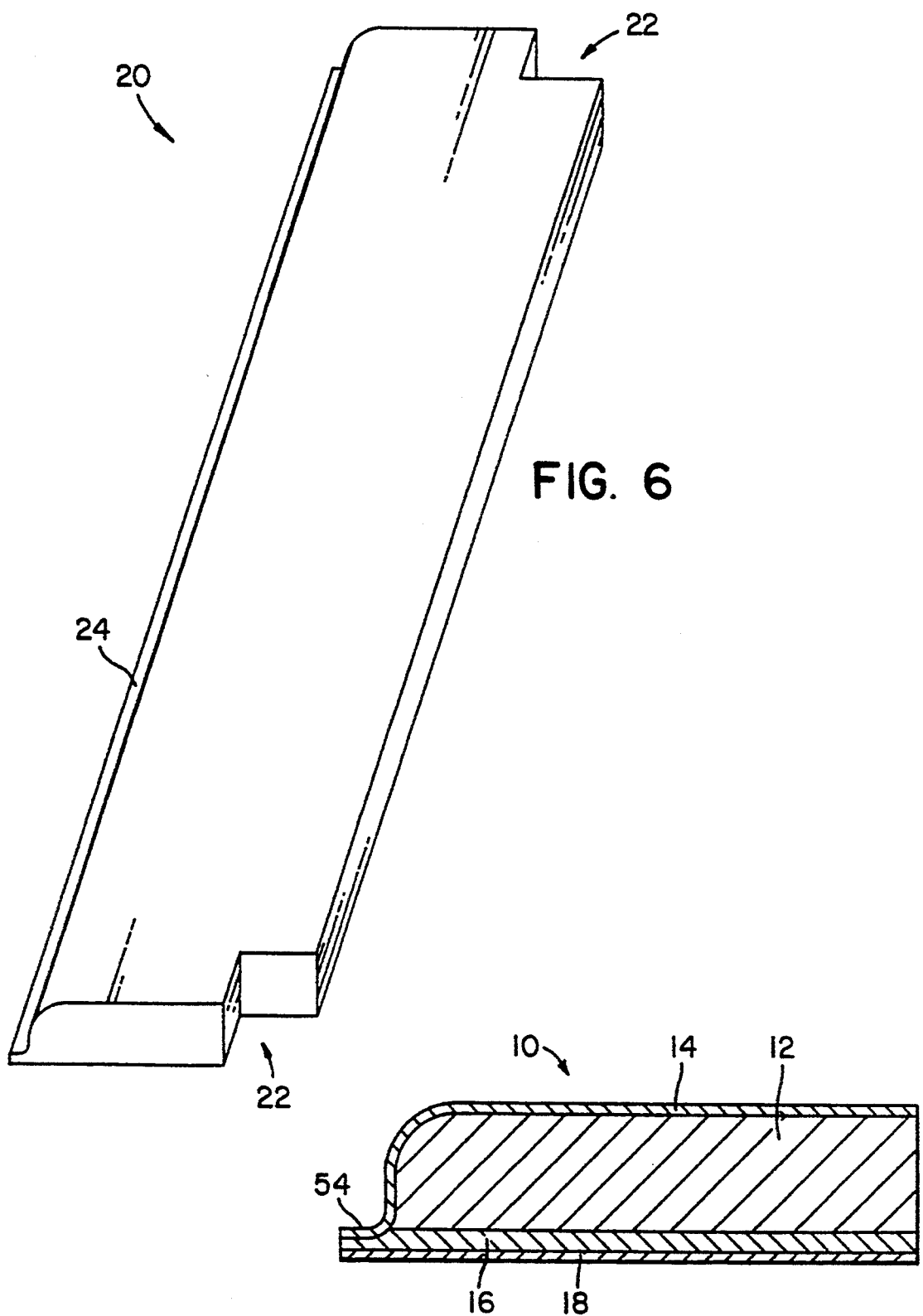
FIG. 5 is a cross-sectional side view of an individual pillowed chip of light lock material formed according to the subject invention.
FIG. 6 is an isometric view of an individual pillowed chip of light lock material complete with notches.

The raw foam light lock material web 36 in stockroll form is mounted to the unwind station 30. Referring to FIG. 5, the fabric web 10 is made of a thin top layer of a brushed pile surface material, such as polyester fabric 14, which is flame bonded to a second layer of foam, such as open cell polyurethane foam 12. Under the foam is a rayon yarn 16 backing material. The web construction also includes a polystyrene substrate 18 which is bonded to the bottom of the web under the rayon yarn 16.

The web has been slit to the width of the cartridge opening, and the polystyrene backing material has been laminated to it. The stockroll is first unwound. A weighted looper is used to maintain approximately 1.5 lb. tension on the 1.500 inch wide web. This tension is necessary to desensitize the subsequent processes to incoming foam thickness variations. The leading end of the web material 36 is threaded down the length of the web guide channel 38 until it comes in contact with the notch shuttle 32. Start up requires that the web 36 be advanced into the notch shuttle 32 and cycled sixteen pitches until the first profile reaches the shuttle station. The computer program which controls all machine functions will reject all unprofiled chips automatically. The main drive for advancing the web 36 is designed into the notch shuttle 32 which grips the web and moves one cycle distance (the length of a chip) at a time in feeding the cut-off assembly 34. The unwind 30 is motorized and step feeds the web 36 to the apparatus as needed while keeping tension on the web 36 which is also required. With the machine now loaded with raw web material, automatic cycling may begin.

Figure 3:
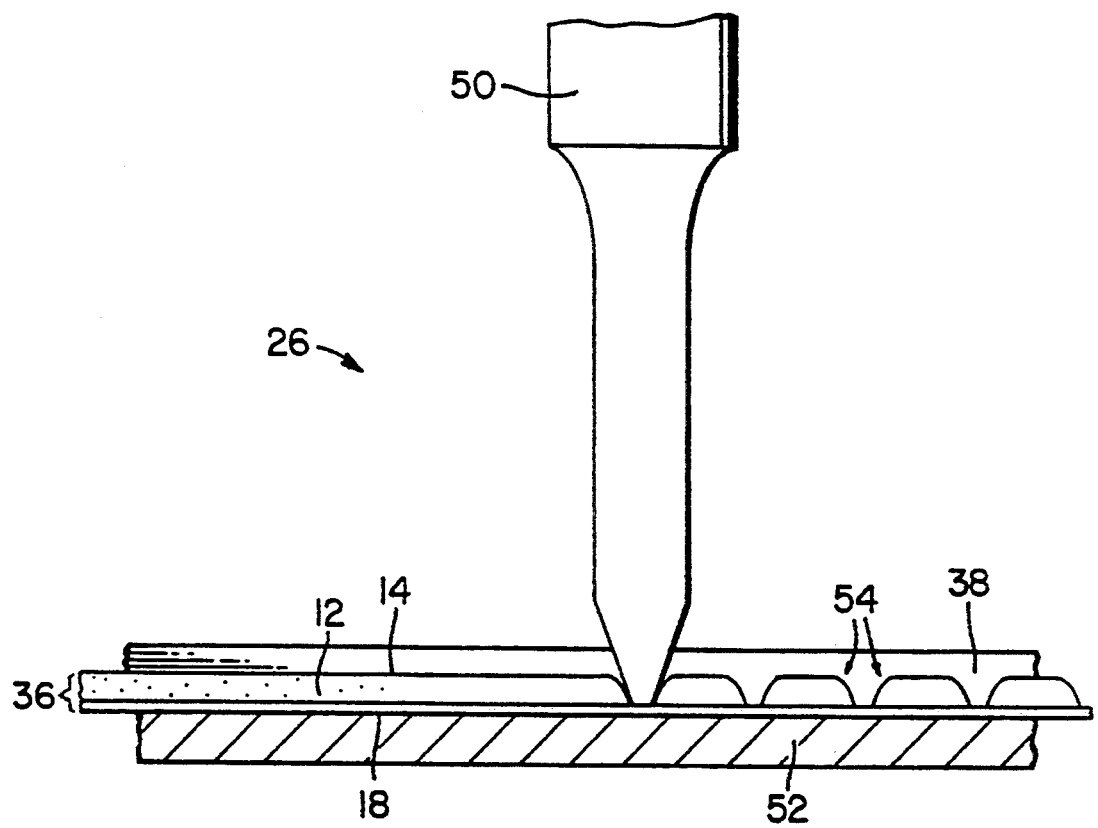
FIG. 3 is a cut-away side view of a pillowing apparatus according to one embodiment of the subject invention.

Referring to FIG. 3, one complete automatic cycle starts with the ultrasonic profile station 26 by activation of its air cylinder which lowers a 20 Kilohertz ultrasonic horn assembly 50 until it comes in contact with a fixed bottom stop. This compresses the web 36 to an 0.008 thousandths of an inch thick dimension between the working surface of the ultrasonic horn 50 (a dull blade configuration) and the ultrasonic anvil 52 which forms the base of the web guide channel 38. After a 500 millisecond delay in this position the ultrasonic horn is activated by an ultrasonic generator for 200 milliseconds, welding or sealing a flat area across the web width and creating a curvature in the width of the web on both sides of the welded area. This weld is caused by the heat produced by the high frequency vibration of the ultrasonic horn, which melts the cross section of the web to the polystyrene substrate.

Figure 4:
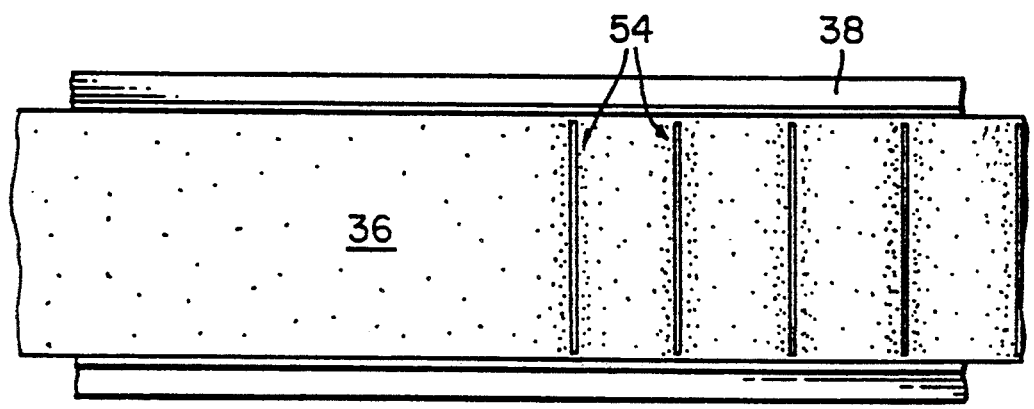
FIG. 4 is a top view of a pillowed web of light lock material.

At the end of 200 milliseconds weld time, the generator is de-energized. The ultrasonic horn is held in place against the welded portion of the web for an additional 300 milliseconds while the welded area solidifies. At the end of this duration, the cylinder is retracted, removing the ultrasonic horn from contact with the web. The result is a profile or pillow 54 in the web 36 of light lock material, as also shown in FIG. 4. The profile is required to facilitate thrusting of film from the cartridge without binding. The profile is only required on the leading edge, therefore the ultrasonic horn is only activated every other machine cycle.

Figure 7:
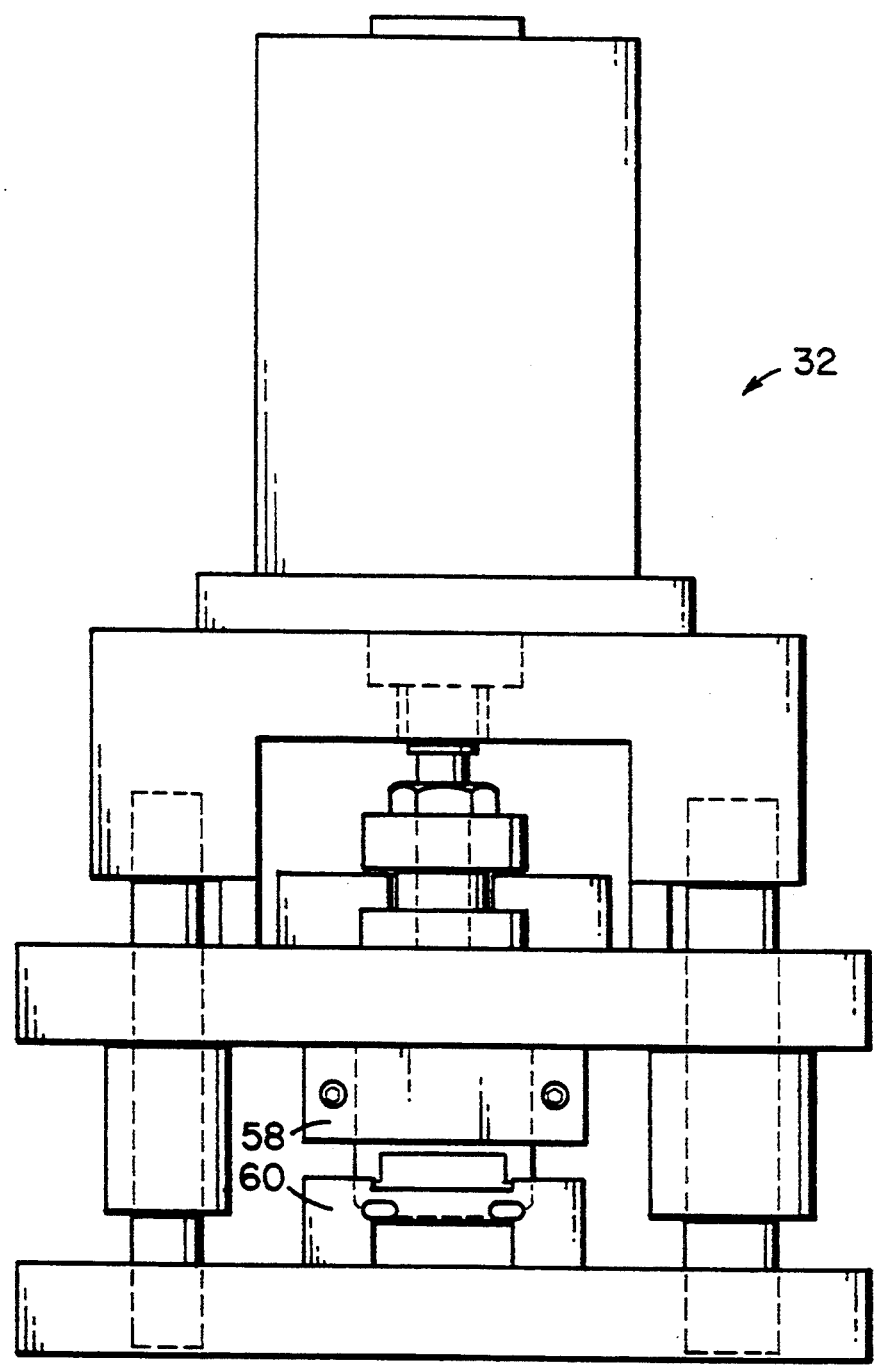
FIG. 7 is a cut-away front view of a notching apparatus according to one embodiment of the subject invention.
Figure 8:
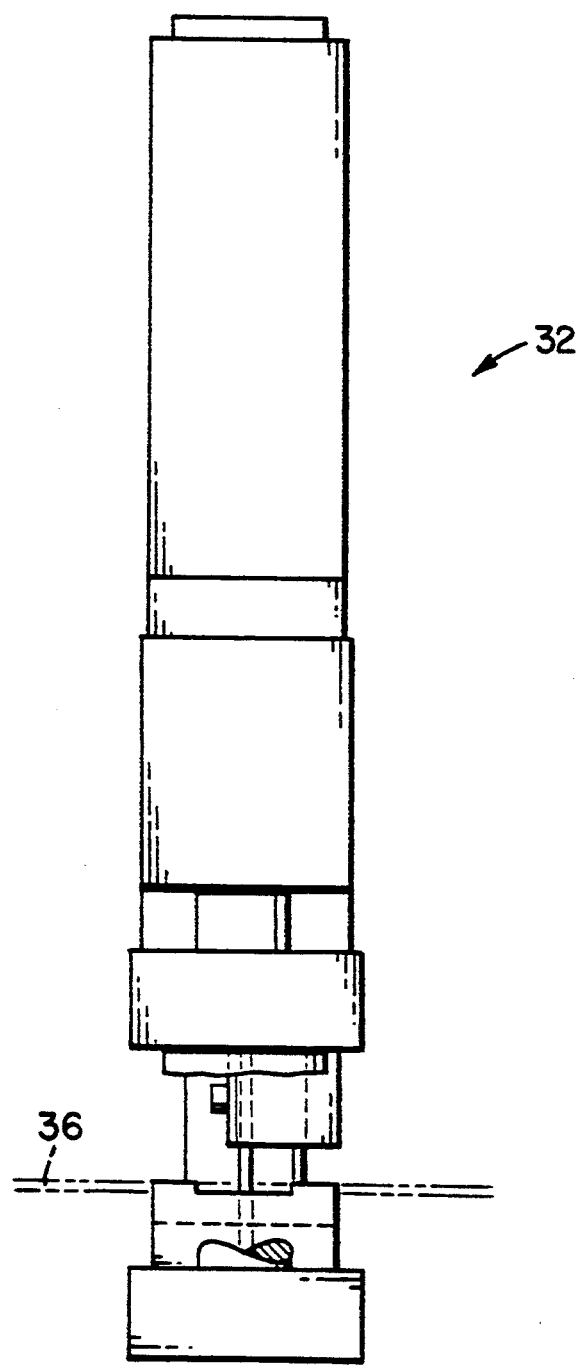
FIG. 8 is a cut-away side view of the notching apparatus shown in FIG. 7.

With the profile complete, the notch shuttle 32 has clamps which grip the web at each side and advance it. The clamps grip the web at the center between two profiled edges (see FIGS. 7 and 8 for notching die). The notching die is then activated and punches out a section on each edge of the web on this center line as shown in FIG. 6, in an orientation which creates the notches 22 in two chips 20 simultaneously. The notches are generated midway between the profiled edges 24 by a zero clearance punch 58 and die 60 (see FIG. 7). This notching die 32 is mounted to a set of precision slides and is shuttled forward by a linear motor.

To achieve the notch feature every other cycle, the clamps are designed with notching punches attached. When the clamps grip the web, the punches simultaneously cut the notch on both sides and then the shuttle moves the web two pitches before releasing the web and returning to home position at the next non-profiled edge location. Thus, the shuttle returns two pitches, the notches are cut out, the shuttle goes forward one pitch, the ultrasonic horn forms a pillow, the shuttle goes forward one pitch, the web is released, and the shuttle again returns two pitches.

Thus, the notch shuttle mechanism 32 moves the web forward one chip length and the ultrasonic profile process 26 is activated again, and so this alternating action continues in this order: web advance; weld a profile while the notching die stays inactive; web advance; and activate notching die to punch out notches while the ultrasonic profile station stays inactive.

Figure 9:
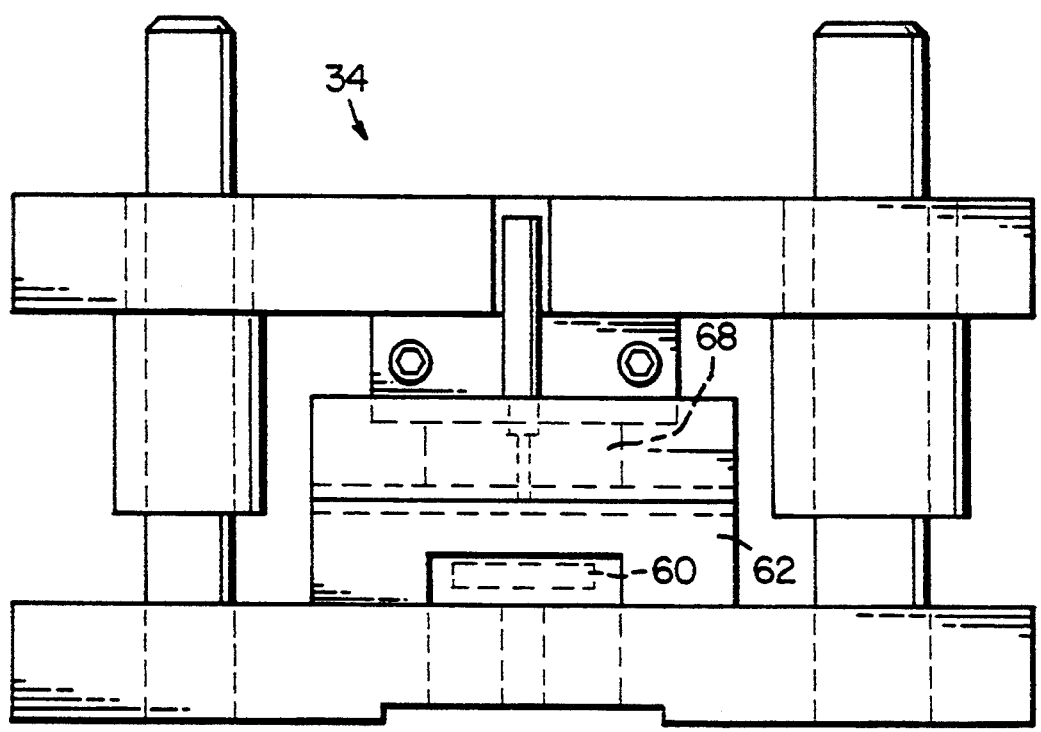
FIG. 9 is a cut-away front view of a cutting apparatus according to one embodiment of the subject invention.
Figure 10:
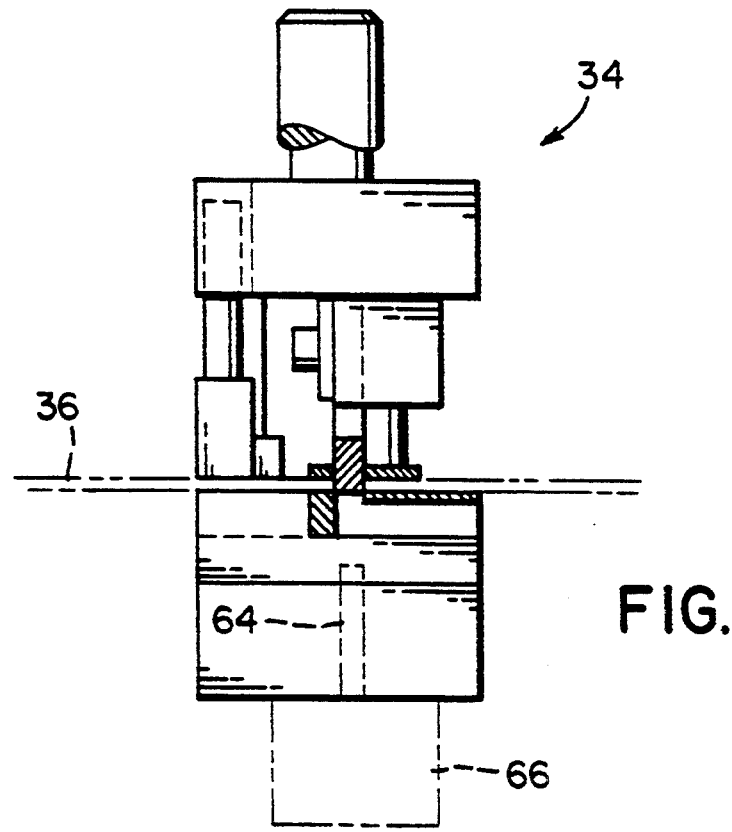
FIG. 10 is a cut-away side view of the cutting apparatus shown in FIG. 9.

The profiled and notched light lock material then advances to the cut-off die 34 (see FIGS. 9 and 10)

where the material is cut into individual chips by a zero clearance punch 68 and die 62. The cut-off die 34 operates every cycle, alternating between cutting profiled edges of two consecutive chips and then cutting between non-profiled edges of two consecutive chips with the notch feature already completed. The result when this web has gone through the cut-off die 34 located to the right of the notching die 32 in the machine 28 is a chip with one width edge ultrasonically welded forming a 0.020 thousandths of an inch flat edge and a curved profile of the surface material, while the opposite width edge is chipped straight off with a small rectangular notch at each corner (see FIG. 6).

A set of back-up fingers 64 that are driven by an air cylinder 66 support the chips when they are cut at the cut-off die 34, and helps place them oriented in a nest 60 that is located below the die set. The nests 60 are attached to a metal belt, which indexes them out from underneath the die set, and delivers them to a cartridge for insertion.

This apparatus and process allows for the handling of the light lock material as individual pieces rather than in continuous web form, while maintaining the orientation of the light lock chips out the bottom of the die set in such a manner that they can be delivered oriented to a subsequent application process.

The attachment of the polystyrene substrate accomplishes two requirements needed for a successful profiling and assembly process. First, the rigidity of the substrate forces the surface material to form a one sided profile which creates the lead in edge. The ultrasonic horn in creating the lead in edge forms a flat valley 0.040 thousandths of an inch wide by 1.470 inches long across the width of the web. The horn delivers high frequency vibration to this area attaching the polyester fabric surface material, and rayon yarn backing, to the polystyrene substrate thereby squeezing the majority of the open cell polyurethane foam to either side of the weld. This profile lead in edge is the preferred configuration for thrusting enhancement to help eliminate thrust failures and high torque conditions in the assembled product.

Secondly, this one sided profile is imperative to the tucking process (the placement of the foam chip in a film cartridge). The die set that creates the chip slices this profiled area through the middle of the 0.040 thousandths of an inch width which produces two 0.020 thousandths of an inch wide flat edges on two consecutive chips. This welded area of the profile formed by the face of the ultrasonic horn is made possible by the rigidity of the substrate. This edge must be flat to allow the tucking process to take place in a subsequent assembly process down stream on the assembly machine. This flat edge must fit under a small under cut groove in the cartridge shell halves during assembly.

Another feature of the invention is the non-full width profile or indented edges of the ultrasonic weld area (see FIG. 4), which is required to minimize growth of the web during the ultrasonic profiling process. This is accomplished by designing the ultrasonic horn face in such a way that it is slightly narrower than the width of the web (i.e., 0.015 thousandths of an inch on either side of the weld area). Without this feature the subsequent indexing of the profiled web to the cut-off station would be much more difficult, and the proper indexing distance is important for repeatable chip dimensions.

The profile or indented edges are also important in respect to web guide on the assembly apparatus. To weld to the edges would create excess web melt producing debris extending out the edges of the horizontal surface produced by the ultrasonic horn. This would make indexing of the profiled web between the web guide channel to the cut-off station impossible.

The non-full width design also prevents web steer (skew). The web width dimension is 1.500 inches. The ultrasonic horn width is 1.470 inches. The tolerance on web width dimension must be $+/-$ 0.010 of an inch or less to prevent this. If the ultrasonic horn is not centered and perpendicular to the web in such a way that the ultrasonic horn tip is allowed to reach the edge of the web during the seal cycle, it will cause the web to grow longer on that particular side in a kind of fanning affect. Because the web guide channel will not allow the web to turn or skew, the web will curl up in the guide channel between the profile station and the cut-off station creating a machine jam.

Horn gap with relation to the anvil and resulting quality to the flat horizontal surface of the profiled area is also very important to the assembly process. Too much gap will result in incomplete welding of the lead in edge. Too little gap will create burns, bumps, and bubbles in the weld area and delamination of the profile at the edge of the flat plane.

Although preferred embodiments have been depicted and described in detail herein, it will be apparent to those skilled in the relevant art that various modifications, additions, substitutions and the like can be made without departing from the spirit of the invention, and these are therefore considered to be within the scope of the invention as defined by the following claims.

What is claimed:

1. An apparatus for forming individual chips of light lock material for placement in a cartridge, said apparatus comprising:

a source of an elongated strip of light lock material, said strip having opposed edges;

a machine frame;

pillowing means mounted to said frame for forming transverse seams in said strip of light lock material, so that each seam is flanked on said strip by a pillowed profile in said light lock material;

notching means mounted to said frame for cutting notches in said opposed edges between said transverse seams;

cutting means mounted to said frame for cutting said strip of light lock material transversely at said transverse seams and transversely at said notches so as to form individual chips of light lock material, whereby each of said chips has a first transverse edge formed from a portion of one of said transverse seams next to said pillowed profile and a second transverse, straight-cut edge formed opposite said first edge; and positioning means mounted to said frame for moving said strip of light lock material from said pillowing means to said notching means and said cutting means.

2. The apparatus of claim 1 wherein said pillowing means comprises:

an ultrasonic horn engageable with one side of said light lock material for transmitting ultrasonic vibrations to said light lock material so as to compress said light lock material to form said transverse seams; and an ultrasonic anvil axially aligned with said ultrasonic horn and engageable with the other side of said strip of light lock material.

3. The apparatus of claim 1 wherein said notching means comprises a punch and die assembly.

4. The apparatus of claim 1 wherein said cutting means comprises a punch and die assembly.

5. The apparatus of claim 1 wherein said positioning means comprises a guide channel in which said strip of light lock material moves and shuttle clamps supported by said notching means which clamps pull said light lock material along in said guide channel, wherein said guide channel is aligned beneath each of said pillowing means, said notching means, and said cutting means.

6. The apparatus of claim 1 further comprising means for collecting said individual chips of light lock material.

7. The apparatus of claim 6 wherein said means for collecting comprises fingers to support one of said individual chips of light lock material and place said one of said individual chips of light lock material in a chip nest.

8. The apparatus of claim 7 wherein said chip nest is positioned on a conveyor to transport said chip nest to a cartridge into which said individual chip of light lock material will be placed.

9. An apparatus for forming individual chips of light lock material for placement in a cartridge, said apparatus comprising:
- a source of an elongated strip of light lock material, said strip having opposed edges;
- a machine frame;
- pillowing means mounted to said frame for forming transverse seams in said strip of light lock material, so that each seam is flanked on said strip by a pillowed profile in said light lock material;
- cutting means mounted to said frame for cutting said light lock material transversely at and between said transverse seams so as to form individual chips of light lock material, whereby each of said chips has a first transverse edge formed from a portion of one of said transverse seams next to said pillowed profile and a second transverse, straight-cut edge formed opposite said first edge; and
- positioning means mounted to said frame for moving said strip of light lock material from said pillowing means to said cutting means.

10. An apparatus for forming individual chips of light lock material for placement in a cartridge, said apparatus comprising:
- a source of an elongated strip of light lock material, said strip having opposed edges;
- a machine frame;
- pillowing means mounted to said frame for forming transverse seams in said strip of light lock material, so that each seam is flanked on said strip by a pillowed profile in said light lock material;
- a notcher mounted to said frame for cutting notches between said transverse seams;
- a cutter mounted to said frame for cutting said light lock material transversely at said transverse seams and transversely at said notches so as to form individual chips of light lock material, whereby each of said chips has a first transverse edge formed from a portion of one of said transverse seams next to said pillowed profile and a second transverse, straight-cut edge formed opposite said first edge; and
- positioning means mounted to said frame for moving said strip of light lock material from said pillowing means to said cutting means.

11. An apparatus for forming individual chips of light lock material for placement in a cartridge, said apparatus comprising:
- a source of an elongated strip of light lock material, said strip having opposed edges;
- a machine frame;
- pillowing means mounted to said frame for forming transverse seams in said strip of light lock material, so that each seam is flanked on said strip by a pillowed profile in said light lock material;
- a cutter mounted to said frame for cutting said light lock material transversely at and between said transverse seams so as to form individual chips of light lock material, whereby each of said chips has a first transverse edge formed from a portion of one of said transverse seams next to said pillowed profile and a second transverse, straight-cut edge formed opposite said first edge; and
- positioning means mounted to said frame for moving said strip of light lock material from said pillowing means to said cutting means.

* * * * *